US008763780B2

(12) United States Patent
Schreiner

(10) Patent No.: US 8,763,780 B2
(45) Date of Patent: Jul. 1, 2014

(54) DETACHABLE ADJUSTABLE HOPPER FOR USE WITH A PORTABLE GRAIN AUGER

(75) Inventor: Gary A. Schreiner, Saskatoon (CA)

(73) Assignee: Gatco Manufacturing Inc. (CA)

( * ) Notice: Subject to any disclaimer, the term of this patent is extended or adjusted under 35 U.S.C. 154(b) by 0 days.

(21) Appl. No.: 13/547,095

(22) Filed: Jul. 12, 2012

(65) Prior Publication Data

US 2013/0213770 A1    Aug. 22, 2013

Related U.S. Application Data

(63) Continuation-in-part of application No. 13/420,020, filed on Mar. 14, 2012, now abandoned.

(30) Foreign Application Priority Data

Feb. 22, 2012  (CA) ..................................... 2768953
Mar. 23, 2012  (CA) ..................................... 2772342

(51) Int. Cl.
*B65G 15/26*    (2006.01)

(52) U.S. Cl.
USPC .......................... 198/313; 198/581; 198/550.2

(58) Field of Classification Search
USPC ........... 198/313, 550.2, 550.01, 550.6, 550.1, 198/632, 581, 586
See application file for complete search history.

(56) References Cited

U.S. PATENT DOCUMENTS

| | | | | |
|---|---|---|---|---|
| 3,735,915 A * | 5/1973 | Fuss | ............................... | 222/571 |
| 3,858,772 A * | 1/1975 | Myers, Jr. | ..................... | 222/460 |
| 3,974,908 A * | 8/1976 | Keichinger | .................. | 198/314 |
| 4,226,477 A * | 10/1980 | Capoccia | ...................... | 198/518 |
| 5,740,903 A * | 4/1998 | Epp et al. | ...................... | 198/594 |
| 6,382,470 B1 * | 5/2002 | Hu et al. | ....................... | 222/203 |
| 7,992,704 B2 * | 8/2011 | Weiler | .......................... | 198/313 |
| 8,136,670 B2 * | 3/2012 | Garland | ........................ | 209/240 |
| 2012/0145608 A1* | 6/2012 | Garland | ........................ | 209/659 |

\* cited by examiner

*Primary Examiner* — James R Bidwell
(74) *Attorney, Agent, or Firm* — Thompson Hine, L.L.P.

(57) ABSTRACT

An adjustable hopper including a base structure is designed for being mounted to an intake of a conveying mechanism for conveying particulates. A bottom portion of a flexible hopper structure is mounted to the base structure. A top structure is mounted to a top portion of the flexible hopper structure. An adjusting mechanism is connected to the base structure and the top structure. The adjusting mechanism enables moving the top structure from a transport position, with the top structure being disposed in proximity to the base structure, to a loading position, with at least a substantial portion of the top structure being disposed at a predetermined distance to the base structure.

18 Claims, 11 Drawing Sheets

DETACHABLE ADJUSTABLE HOPPER FOR USE WITH A PORTABLE GRAIN AUGER

This application is a continuation-in-part of U.S. patent application Ser. No. 13/420,020 filed Mar. 14, 2012 entitled Adjustable Hopper for Use with a Portable Grain Auger, and also claims priority to Canadian Patent Application No. 2,768,953 filed on Feb. 22, 2012, and Canadian Patent Application No. 2,772,342 filed on Mar. 23, 2012. The entire contents of both of these Canadian applications are hereby incorporated by reference.

FIELD

The present invention relates to conveying of particulate material, and more particularly to a detachable adjustable hopper for being mounted to an intake of a portable conveyor.

BACKGROUND

In modern agriculture harvest grain such as, for example, wheat, rye, barley, canola and soybeans, is transported in hopper grain trailers with the hopper forming an unloading outlet for releasing the load disposed on the underside of the trailer for fast and simple unloading. Typically, an intake of a portable conveyer such as a top drive portable auger is disposed in a bucket-shaped non-adjustable hopper and moved under the unloading outlet for receiving the grain and conveying the same to a remote location. Alternatively, the portable grain auger is fitted with a non-adjustable hopper.

With the unloading outlet being disposed in close proximity to ground it is difficult to move the intake with the non-adjustable hopper under the unloading outlet. In some instances, a swing-away hopper for receiving the grain and conveying the same to the portable auger intake is employed in order to facilitate positioning under the unloading outlet. Typically, the swing-away hopper has an auger and drive mechanism for conveying the grain, thus forming a rather complex mechanism for feeding the grain from the unloading outlet to the portable auger intake.

Unfortunately, the non-adjustable hopper, as well as the swing-away hopper, does not provide a close fit between the hopper and the unloading outlet, resulting in grain being thrown out of the hopper by the rotating auger.

It is desirable to provide an adjustable hopper that provides a substantially close fit between the hopper and the unloading outlet.

It is also desirable to provide an adjustable hopper that is detachable installed to an intake of a portable grain auger.

It is also desirable to provide an adjustable hopper that is simple and easy to install to an intake of a portable grain auger.

It is also desirable to provide an adjustable hopper that is easily moved under the unloading outlet.

SUMMARY

Accordingly, one object of the present invention is to provide an adjustable hopper that provides a substantially close fit between the hopper and the unloading outlet.

Another object of the present invention is to provide an adjustable hopper that is detachable installed to an intake of a portable grain auger.

Another object of the present invention is to provide an adjustable hopper that is simple and easy to install to an intake of a portable grain auger.

Another object of the present invention is to provide an adjustable hopper that is easily moved under the unloading outlet.

According to one aspect of the present invention, there is provided an adjustable hopper. A base structure is designed for being mounted to an intake of a conveying mechanism for conveying particulates. A bottom portion of a flexible hopper structure is mounted to the base structure. A top structure is mounted to a top portion of the flexible hopper structure. An adjusting mechanism is connected to the base structure and the top structure. The adjusting mechanism enables moving the top structure from a transport position, with the top structure being disposed in proximity to the base structure, to a loading position, with at least a substantial portion of the top structure being disposed at a predetermined distance to the base structure.

According to one aspect of the present invention, there is provided an adjustable hopper. A base structure is designed for being mounted to an intake of a conveying mechanism for conveying particulates. A bottom portion of a hopper structure made of a flexible material is mounted to the base structure. A top structure is mounted to a top portion of the flexible hopper structure. An adjusting mechanism is connected to the base structure and the top structure. The adjusting mechanism enables moving the top structure from a transport position, with the top structure being disposed in proximity to the base structure, to a loading position, with at least a substantial portion of the top structure being disposed at a predetermined distance to the base structure. The adjusting mechanism enables pivotal movement and longitudinal movement of the top structure.

One advantage of the present invention is that it provides an adjustable hopper that provides a substantially close fit between the hopper and the unloading outlet.

A further advantage of the present invention is that it provides an adjustable hopper that is detachable installed to an intake of a portable grain auger.

A further advantage of the present invention is that it provides an adjustable hopper that is simple and easy to install to an intake of a portable grain auger.

A further advantage of the present invention is that it provides an adjustable hopper that is easily moved under the unloading outlet.

BRIEF DESCRIPTION OF THE DRAWINGS

One embodiment of the present invention is described below with reference to the accompanying drawings, in which:

FIG. 1b is a simplified block diagram illustrating a perspective view of an intake of the portable grain auger shown in FIG. 1a;

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While the description of the embodiments herein below is with reference to an adjustable hopper for use with a portable grain auger, it will become evident to those skilled in the art that the embodiments of the invention are not limited thereto, but are also applicable for other types of conveyors such as, for example, belt conveyors and other types of particulate materials.

Figure 1A:
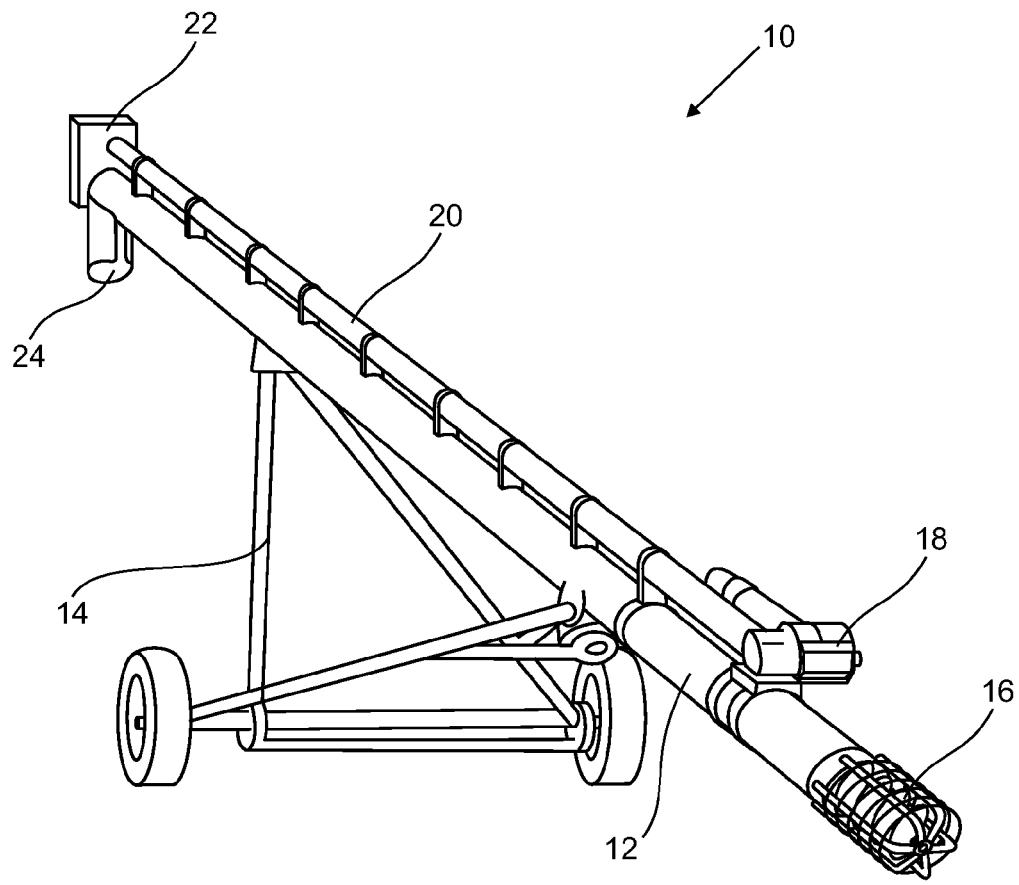
FIG. 1a is a simplified block diagram illustrating a perspective view of a state of the art portable grain auger for use with the adjustable hopper according to one embodiment of the invention.
Figure 1B:
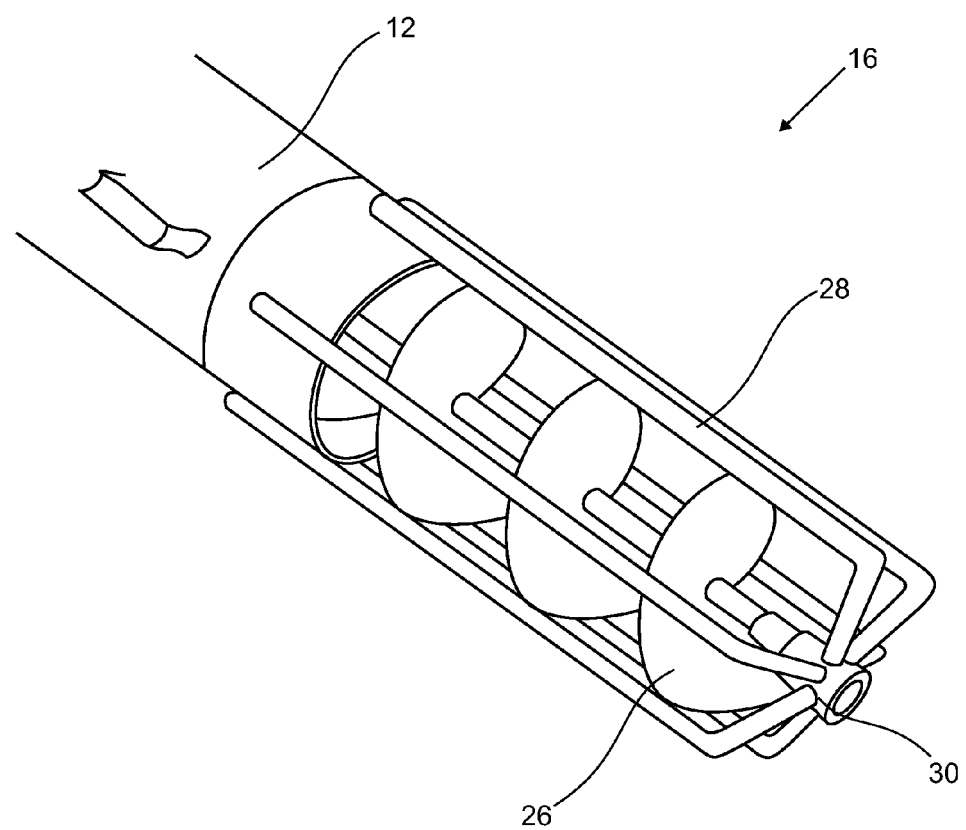

Referring to FIGS. 1a and 1b, a conventional portable grain auger 10 is shown. Typically, auger 26 is disposed in tubular auger housing 12 and extends a predetermined distance therefrom into intake 16. The auger housing 12 is adjustable mounted to chassis 14 such that a height of discharge housing 24 above ground is variable. The auger 26 is driven by a gas engine 18 via drive mechanism 20 and gear 22. The intake 16 comprises shielding 28 mounted to the auger housing 12 and having auger bearing 30 mounted thereto.

Figure 1C:
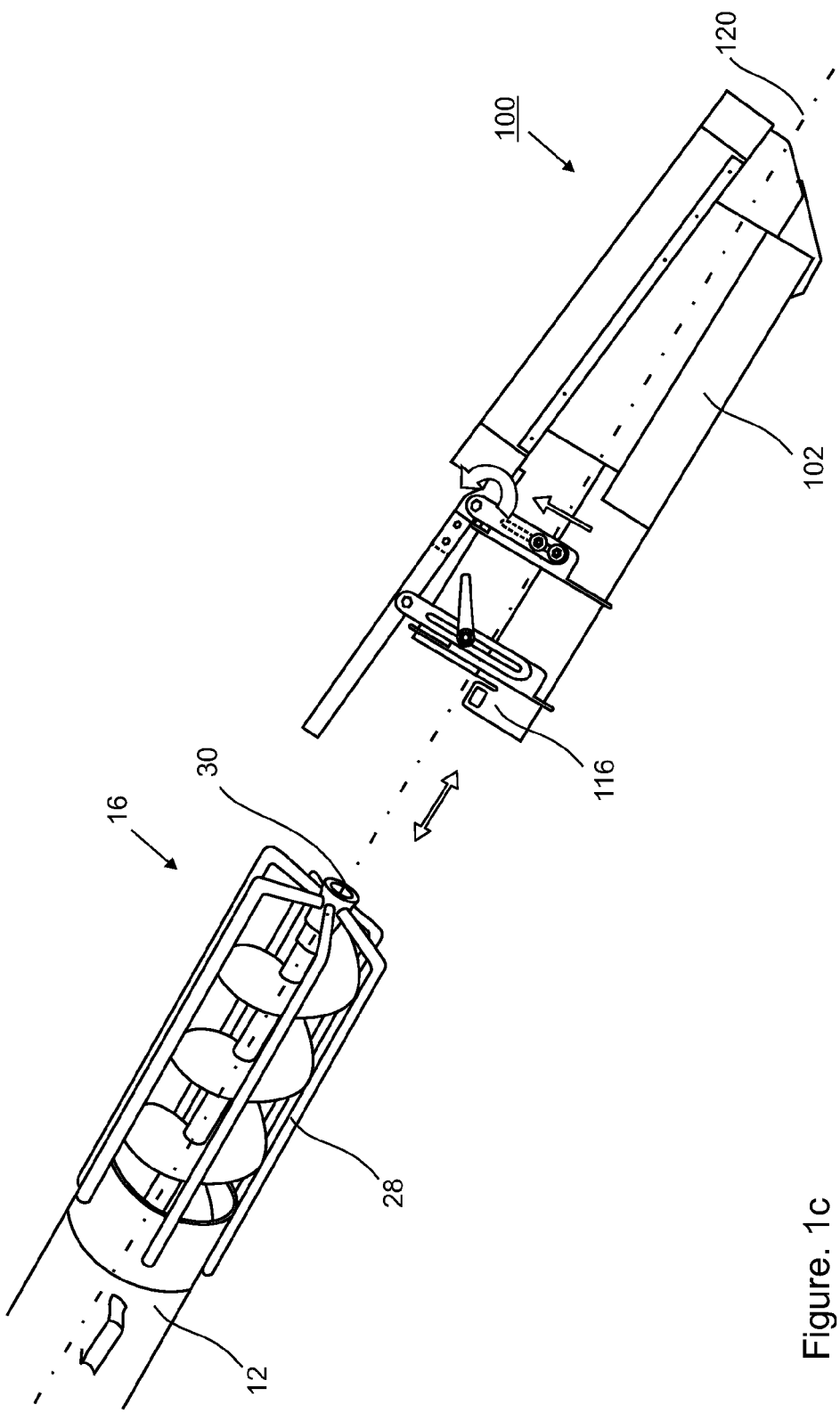
FIG. 1c is a simplified block diagram illustrating attachment and detachment of the adjustable hopper according to one embodiment of the invention.
Figure 2A:
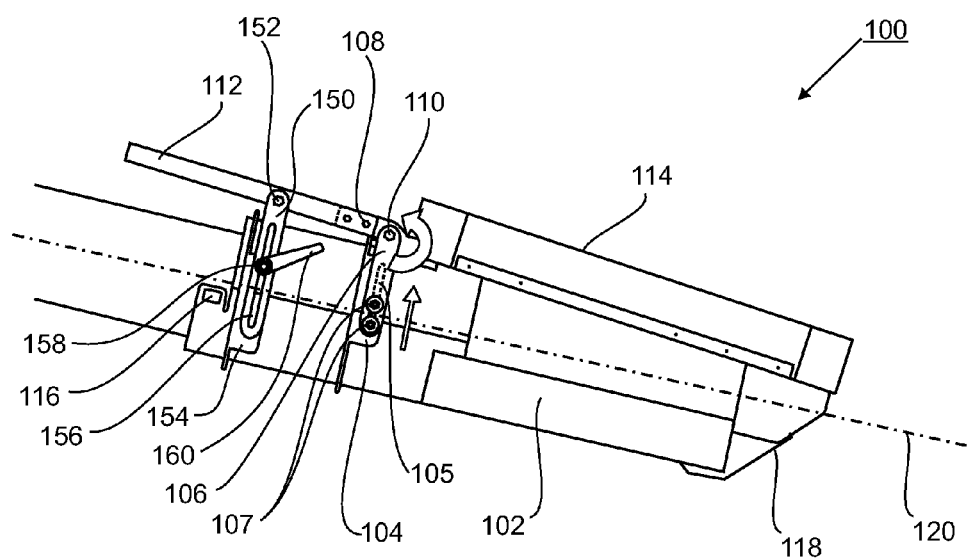
FIGS. 2a and 2b are simplified block diagrams illustrating a side view of the adjustable hopper according to one embodiment of the invention with the hopper in a collapsed and an extended position, respectively.
Figure 2B:
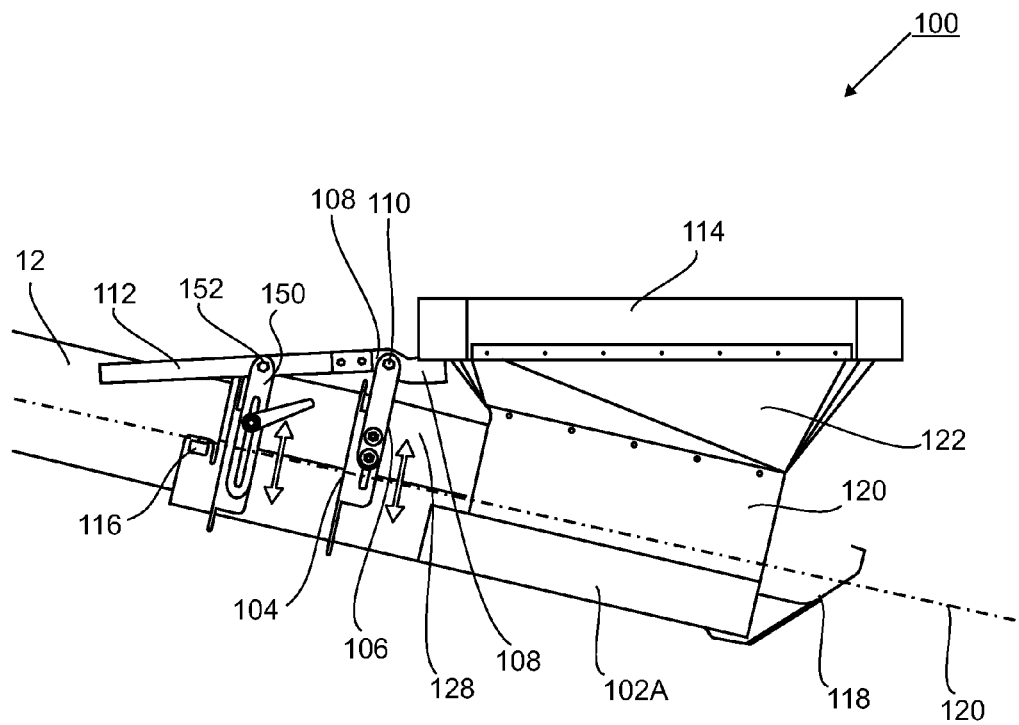
Figure 2C:
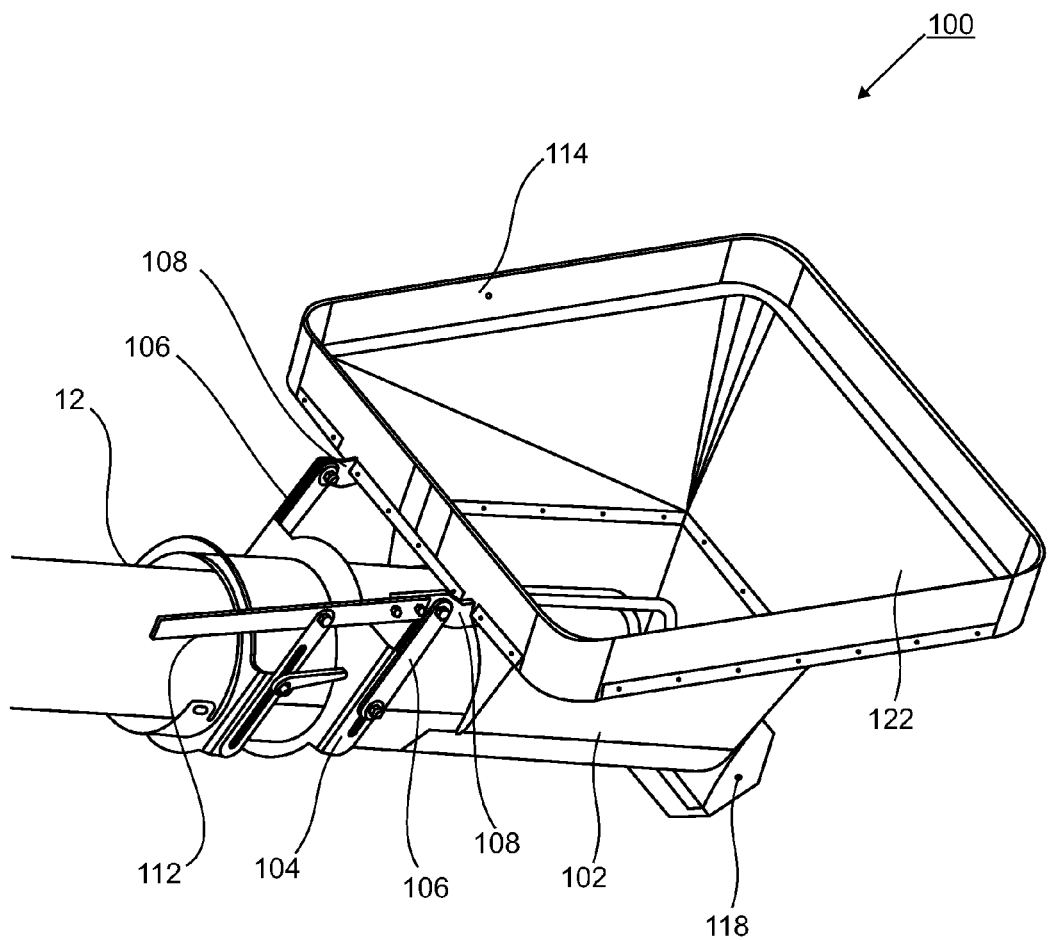
FIGS. 2c to 2e are simplified block diagrams illustrating perspective views of the adjustable hopper according to one embodiment of the invention with the hopper in an extended position.
Figure 2D:
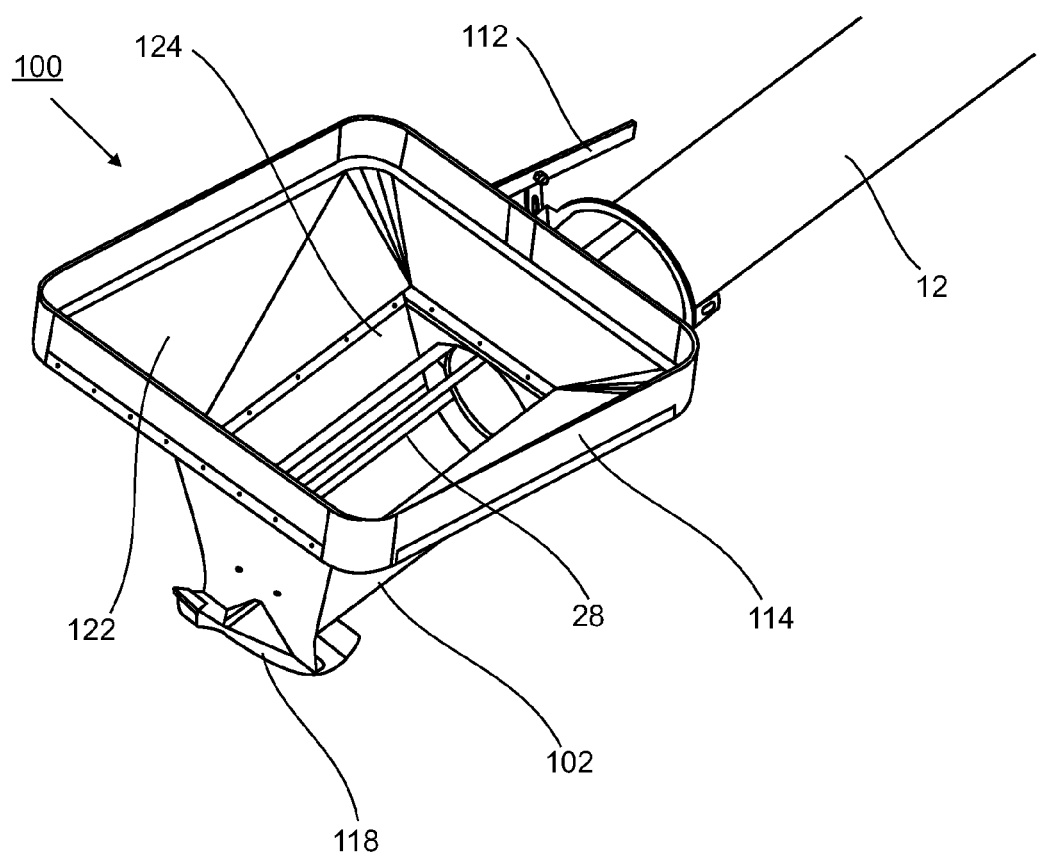
Figure 2E:
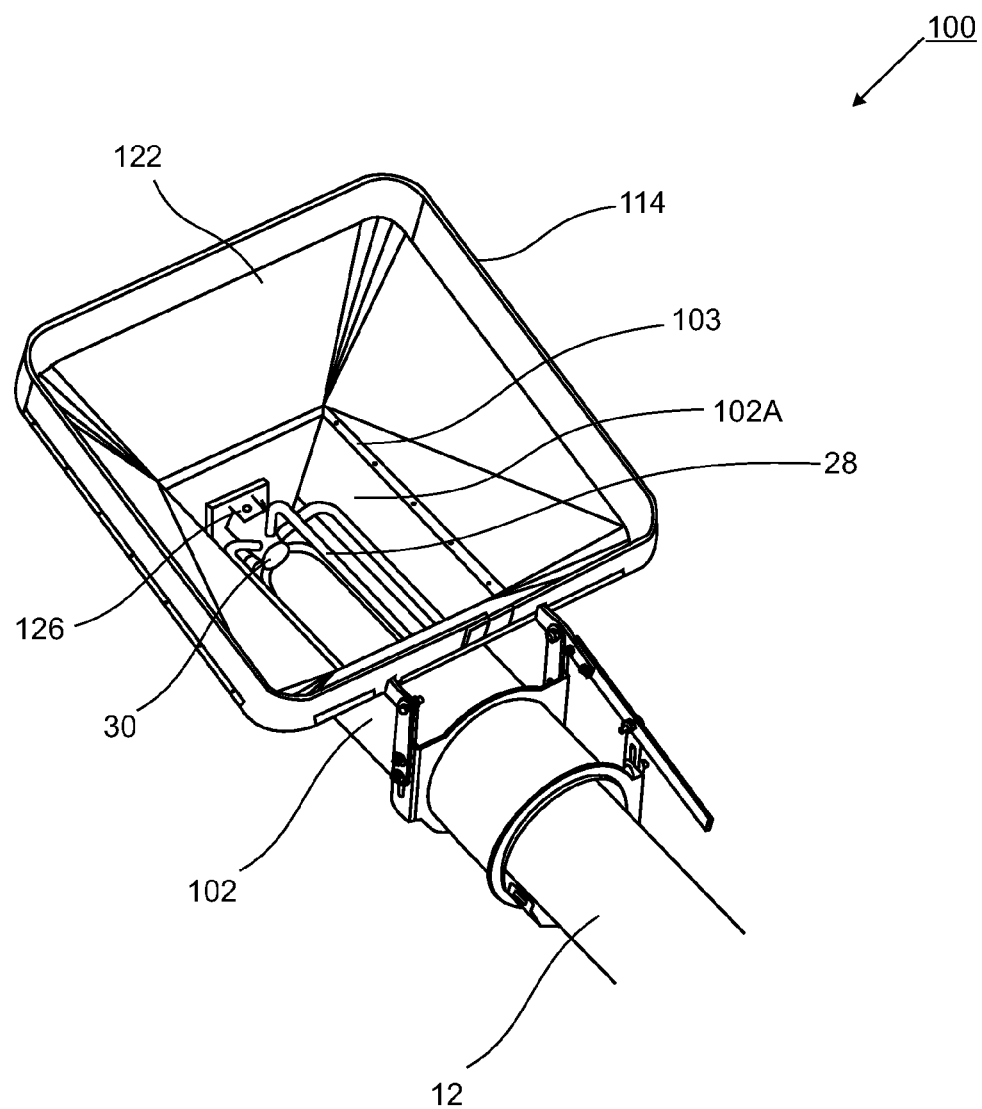

Referring to FIGS. 1c and 2a to 2e, an adjustable hopper 100 according to one embodiment of the invention is provided. Base structure 102 of the adjustable hopper 100 is designed for being mounted in a detachable fashion to an intake 16 of the portable grain auger 10 such that the shielding 28 is disposed therein. As illustrated in FIG. 1c, the base structure 102 is moved along longitudinal axis 120 of auger housing 12 until the shielding 28 is disposed therein and attachment mechanism 116 is partially covering the housing 12 for detachable securing the adjustable hopper 100 thereto using, for example, a strap or ratchet-type tightening device accommodated in apertures of the attachment mechanism 116 disposed on opposite sides of the auger housing 12. The base structure 102 can also be detachable secured to the bearing housing 30 via mounting mechanism 126, as illustrated in FIG. 2e. For example screw bolts are disposed in respective threaded bores of the mounting mechanism 126 for affixing the mounting mechanism 126 to the bearing housing 30 by abutting the same. Optionally, an inside wall of the base structure 102 is shaped such that is provides a snug fit with a portion of the shielding 28 of the portable grain auger 10. The base structure 102 may have a cylindrical bottom structure 102A surrounding a portion of the shielding 28 and an end portion of the auger housing 12 and a box-shaped structure 102B extending substantially upwards therefrom with an upper rim 103 surrounding a—for example, rectangular shaped-intake opening 124.

The base structure 102 is made, for example, of suitable sheet metal such as steel or aluminum using standard manufacturing technologies. Alternatively, the base structure 102 is made, for example, of a suitable plastic material such as polypropylene, polyethylene, or Nylon™ using standard molding technologies.

A bottom portion of flexible hopper structure 122 is mounted to the rim 103 of the base structure 102. The flexible hopper structure 122 can be made of a flexible material having sufficient flexibility for adjusting the flexible hopper structure 122 between a transport position—with the flexible hopper structure 122 being collapsed, as illustrated in FIG. 2a—to a loading position—with the flexible hopper structure 122 being partially or fully extended, as illustrated in FIG. 2b.

The flexible hopper structure 122 can be made of a suitable flexible material having sufficient abrasive resistance such as fabric reinforced rubber using, for example, cotton, fiberglass, Nylon™, or Kevlar™ for the fabric canvas and natural rubber, Silicone™, or Neoprene™ for the rubber-type material.

The flexible hopper structure 122 is mounted to the rim 103 of the base structure 102 in a conventional manner using, for example, a tight fit, an adhesive, rivets, or screws.

The top structure 114 can form a ring and is mounted to a top portion of the flexible hopper structure 122 in a conventional manner. The top structure 114 is, in one embodiment, of rectangular shape and sized to conform to the respective unloading outlet of the hopper grain trailer. The top structure 114 is made in a conventional manner, for example, of a suitable plastic material—such as polypropylene, polyethylene, or Nylon™—or of a suitable metal—such as steel or aluminum.

Alternatively, the top structure 114 is of a different shape such as, for example, circular shape or oval shape.

Figure 2F:
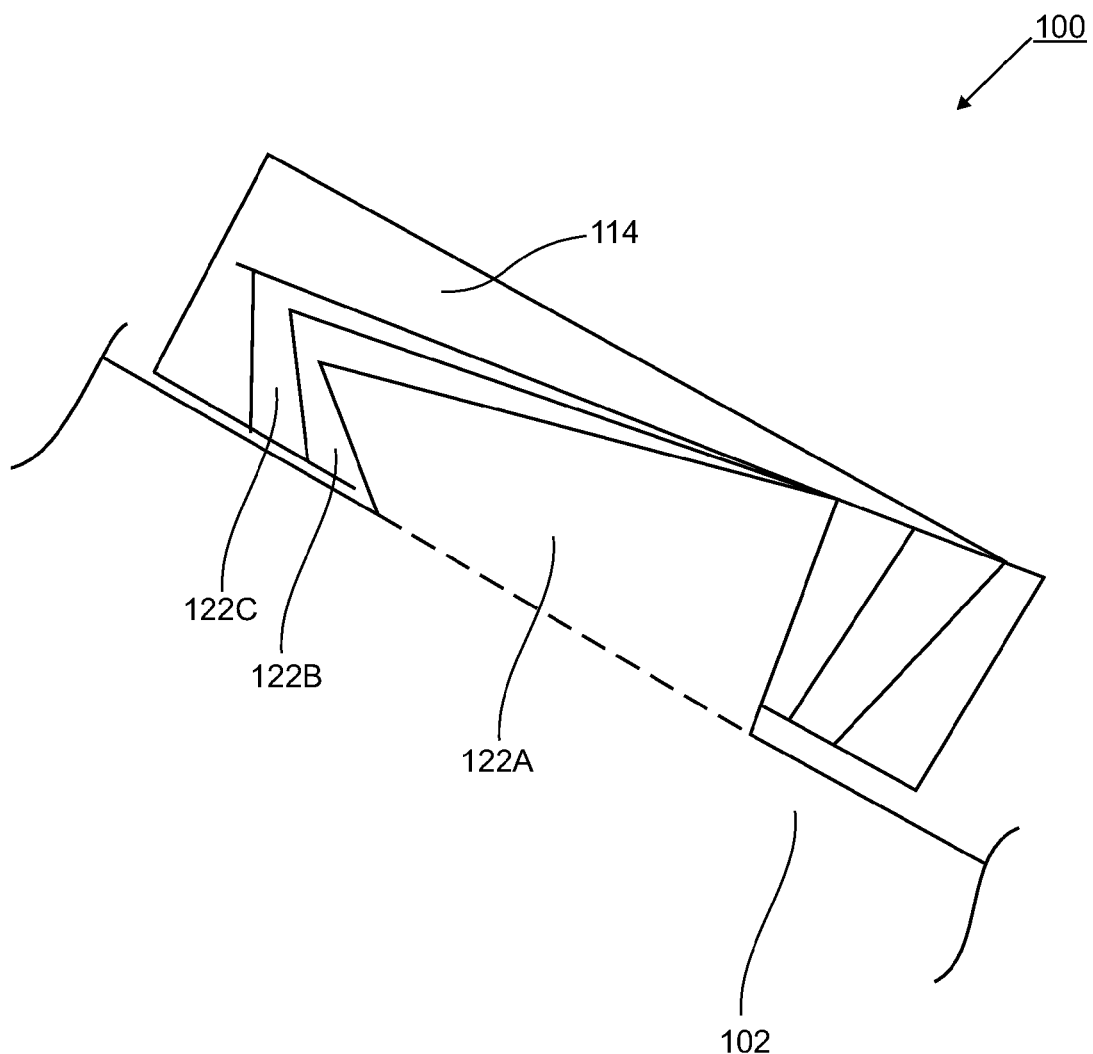
FIGS. 2f and 2g are simplified block diagrams illustrating a cross sectional view of the adjustable hopper according to another embodiment of the invention with the hopper in a collapsed and an extended position, respectively; and, FIG. 3 is a simplified block diagram illustrating a cross sectional view of a holding mechanism for use with the adjustable hopper according to an embodiment of the invention.
Figure 2G:
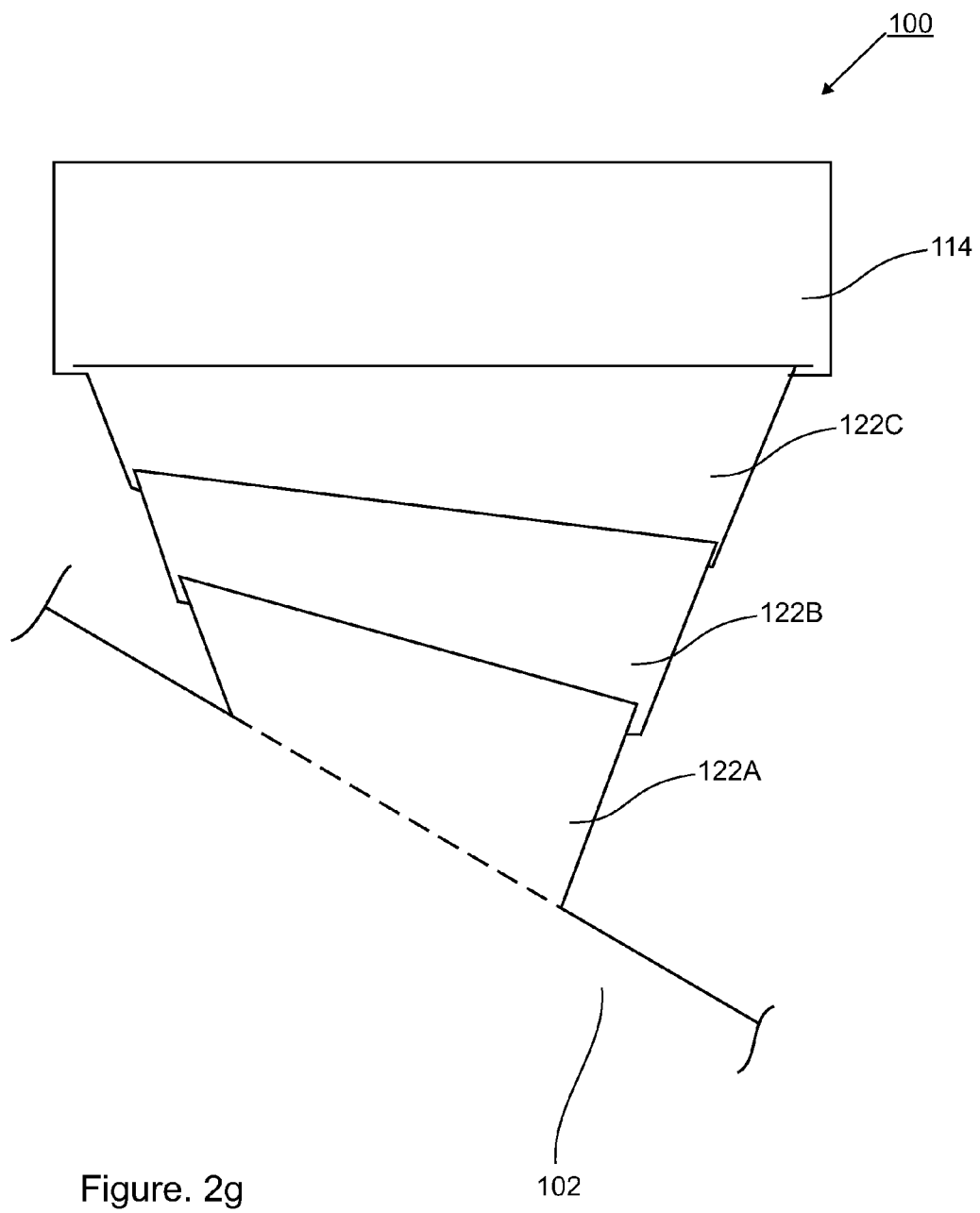

Further alternatively, the flexible hopper structure 122 is realized using nested ring shaped hopper elements 122A, 122B, 122C made of a substantially rigid material—such as, for example, a suitable sheet metal or plastic material—as illustrated in FIGS. 2f and 2g, showing the collapsed and extended hopper structure, respectively.

An adjusting mechanism is connected to the base structure 102 and the top structure 114. The adjusting mechanism enables movement of the top structure 114 from the transport position with the top structure being disposed in proximity to the base structure 102, as illustrated in FIG. 2a, to the loading position with at least a substantial portion of the top structure 114 being disposed at a predetermined distance to the base structure 102. The adjusting mechanism can enable linear movement of the top structure 114 in a direction substantially perpendicular to the longitudinal axis 120 of the auger housing 12 and pivotal movement around pivot 110, as illustrated by the arrows in FIG. 2a. The adjusting mechanism may be capable of holding the top structure 114 in one of a plurality of predetermined loading positions.

The linear movement is enabled, for example, by linear guiding elements 104 mounted to opposite sides of the base structure 102 in a conventional manner using, for example, welds or rivets. Linear adjusting elements 106 are linear movable mounted to the respective linear guiding elements 104 using, for example, screw bolts accommodated in elongated apertures 105 disposed in the linear guiding elements 104 and the linear adjusting elements 106. The linear adjusting elements 106 are then affixed to the linear guiding elements 104 at a predetermined position using respective screw nuts or wing nuts 107.

The pivotal movement is enabled, for example, by pivotal adjusting elements 108 pivotally movable mounted to the respective linear adjusting elements 106 at pivots 110 in a conventional manner using, for example, bolts mounted to the linear adjusting elements 106 and disposed in respective bores of the pivotal adjusting elements 108. Furthermore, one of the pivotal adjusting elements 108 forms a hand lever 112 extending therefrom for enabling an operator to adjust the position of the top structure 114. The top structure 114 is locked in various predetermined positions in a conventional manner using, for example, a second linear adjusting element 150 having the pivotal adjusting element 108 pivotally movable mounted thereto at pivot 152 and being linear movable mounted to second linear guiding element 154 using, for example, screw bolts accommodated in elongated apertures 156 disposed in the second linear guiding element 154 and the second linear adjusting element 150. The second linear adjusting element 150 is then affixed to the second linear guiding element 154 at a predetermined position using a respective screw nut 158 having lever 160 connected thereto.

Figure 3:
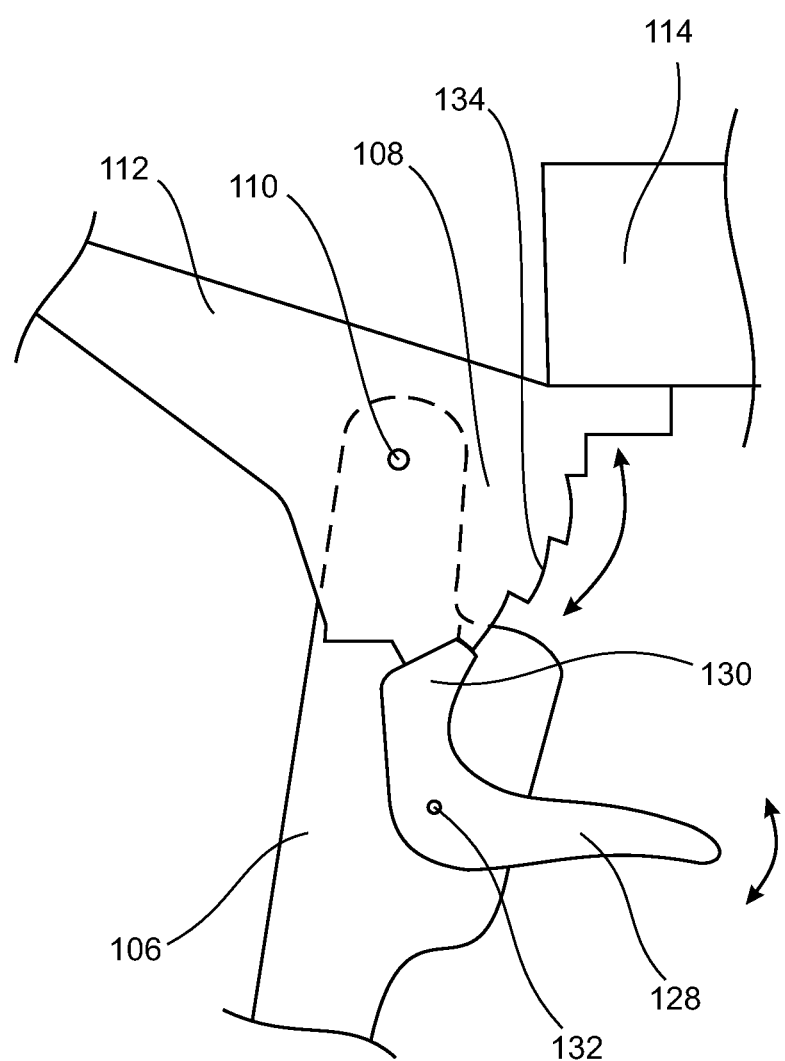

Alternatively, a ratchet type holding mechanism with a gear 134 disposed on one of the pivotal adjusting elements 108 and a pawl 130 pivotally mounted to the respective linear adjusting element 106 at pivot 132, as illustrated in FIG. 3. Pivotal movement of the pawl using lever 128 releases or locks the pivotal adjusting elements 108. Optionally, the pawl is spring loaded for holding the same in a locking position. The linear movement is locked, for example, in a similar fashion using a linear rack instead of gear 134. Further alternatively other mechanisms such as, for example, a bolt disposed in one of a plurality of bores, each associated with a predetermined position of the top structure 114, are employed.

Optionally, the adjusting mechanism is designed for enabling only one of the longitudinal movement and the pivotal movement of the top structure 114, thus simplifying the adjusting mechanism but also limiting the capability of adjusting the hopper. For example, pivotal movement is omitted in case the auger housing 12 is oriented at a fixed angle to the horizontal, i.e. the discharge housing is disposed at a fixed height above ground.

Further optionally, actuators such as, for example, step motors are connected to the adjusting mechanism for enabling remote controlled adjustment of the hopper.

The base structure 102 may have a skid 118 connected thereto for facilitating movement of the portable auger 10 with the adjustable hopper 100 under the unloading outlet of the hopper grain trailer.

The present invention has been described herein with regard to certain embodiments. However, it will be obvious to persons skilled in the art that a number of variations and modifications can be made without departing from the scope of the invention as described herein.

What is claimed is:

1. An adjustable hopper comprising:
    a base structure for being detachable mounted to an intake of a portable grain auger, wherein the base structure is adapted for accommodating an end portion of an auger housing of the portable grain auger and the intake therein, and wherein the base structure comprises a bottom portion surrounding a respective bottom portion of the intake and the end portion of the auger housing;
    a flexible hopper structure, a bottom portion of the flexible hopper structure being mounted to the base structure;
    a top structure mounted to a top portion of the flexible hopper structure; and,
    an adjusting mechanism connected to the base structure and the top structure, the adjusting mechanism for moving the top structure from a transport position, with the top structure being disposed in proximity to the base structure, to a loading position, with at least a substantial portion of the top structure being disposed at a predetermined distance to the base structure.

2. An adjustable hopper as defined in claim 1, wherein the flexible hopper structure is made of a flexible material.

3. An adjustable hopper as defined in claim 2, comprising a holding mechanism for holding the top structure in at least the loading position.

4. An adjustable hopper as defined in claim 3, wherein the holding mechanism is capable of holding the top structure in one of a plurality of predetermined loading positions.

5. An adjustable hopper as defined in claim 2, wherein the adjusting mechanism comprises a pivot for enabling pivotal movement of the top structure.

6. An adjustable hopper as defined in claim 2, wherein the adjusting mechanism comprises a guiding structure for enabling longitudinal movement of the top structure.

7. An adjustable hopper as defined in claim 5, wherein the adjusting mechanism comprises a guiding structure for enabling longitudinal movement of the top structure.

8. An adjustable hopper as defined in claim 2, wherein in the transport position the top structure is oriented in a plane substantially parallel to a longitudinal axis of the conveying mechanism.

9. An adjustable hopper as defined in claim 2, wherein the top structure comprises a ring surrounding the top portion of the flexible hopper structure.

10. An adjustable hopper as defined in claim 1, wherein the base structure comprises an upper portion extending from the bottom portion, the upper portion forming a rim surrounding an intake opening with the rim having the bottom portion of the flexible hopper structure mounted thereto.

11. An adjustable hopper as defined in claim 1, wherein the base structure is made of a substantially rigid material.

12. An adjustable hopper as defined in claim 5, wherein the adjusting mechanism comprises a guiding structure for substantially vertically moving the top structure.

13. An adjustable hopper as defined in claim 12, wherein the adjusting mechanism comprises a holding mechanism and wherein the adjusting mechanism and the holding mechanism are adapted for holding the top structure in one of a plurality of predetermined loading positions.

14. An adjustable hopper as defined in claim 13, wherein the adjusting mechanism and the holding mechanism are adapted for holding the top structure in one of a plurality of predetermined loading positions such that the top structure is oriented substantially horizontal.

15. An adjustable hopper comprising:
    a base structure for being mounted to an intake of a conveying mechanism for conveying particulates;
    a flexible hopper structure, a bottom portion of the flexible hopper structure being mounted to the base structure, wherein the flexible hopper structure is made of a flexible material;
    a top structure mounted to a top portion of the flexible hopper structure; and,
    an adjusting mechanism connected to the base structure and the top structure, the adjusting mechanism for moving the top structure from a transport position, with the top structure being disposed in proximity to the base structure, to a loading position, with at least a substantial portion of the top structure being disposed at a predetermined distance to the base structure, wherein the adjusting mechanism comprises a pivot for enabling pivotal movement of the top structure and guiding structure for substantially vertically moving the top structure, wherein the adjusting mechanism comprises a holding mechanism, and wherein the adjusting mechanism and the holding mechanism are adapted for holding the top structure in one of a plurality of predetermined loading positions.

16. An adjustable hopper as defined in claim 15, wherein the adjusting mechanism and the holding mechanism are adapted for holding the top structure in one of a plurality of predetermined loading positions such that the top structure is oriented substantially horizontal.

17. An adjustable hopper as defined in claim 15, wherein in the transport position the top structure is oriented in a plane substantially parallel to a longitudinal axis of the conveying mechanism.

18. An adjustable hopper as defined in claim 15, wherein the top structure comprises a ring surrounding the top portion of the flexible hopper structure.

\* \* \* \* \*